United States Patent
Yang

(10) Patent No.: US 9,587,890 B2
(45) Date of Patent: *Mar. 7, 2017

(54) VERTICAL FLUID HEAT EXCHANGER INSTALLED WITHIN NATURAL THERMAL ENERGY BODY

(76) Inventor: Tai-Her Yang, Dzan-Hwa (TW)

(*) Notice: Subject to any disclaimer, the term of this patent is extended or adjusted under 35 U.S.C. 154(b) by 840 days.

This patent is subject to a terminal disclaimer.

(21) Appl. No.: 12/591,024

(22) Filed: Nov. 5, 2009

(65) Prior Publication Data

US 2011/0100586 A1 May 5, 2011

(51) Int. Cl.
| F24J 3/08 | (2006.01) |
| F24H 3/00 | (2006.01) |
| F28D 15/00 | (2006.01) |
| F28D 7/02 | (2006.01) |
| F28D 20/00 | (2006.01) |

(52) U.S. Cl.
CPC .......... *F28D 20/0034* (2013.01); *F24J 3/086* (2013.01); *F28D 20/0052* (2013.01); *Y02E 10/16* (2013.01); *Y02E 60/142* (2013.01)

(58) Field of Classification Search
USPC .......... 165/45, 47, 63, 104.21, 163
See application file for complete search history.

(56) References Cited

U.S. PATENT DOCUMENTS

| 2,487,863 A * | 11/1949 | Garretson | 62/50.1 |
| 3,092,972 A * | 6/1963 | Poorman et al. | 62/46.1 |
| 3,874,174 A * | 4/1975 | Greene | 60/641.2 |
| 4,134,273 A * | 1/1979 | Brautigam | 62/141 |
| 4,375,831 A * | 3/1983 | Downing, Jr. | 165/48.1 |
| 4,392,531 A * | 7/1983 | Ippolito | 166/278 |
| 4,454,982 A * | 6/1984 | Reick et al. | 236/92 R |
| 4,489,568 A * | 12/1984 | Shapess | 62/324.1 |
| 4,516,629 A * | 5/1985 | Bingham | 165/45 |
| 4,570,851 A * | 2/1986 | Cirillo | 236/93 R |
| 4,644,750 A * | 2/1987 | Lockett et al. | 60/641.2 |
| 4,993,483 A * | 2/1991 | Harris | 165/45 |
| 5,152,153 A * | 10/1992 | Hsiao | 62/260 |
| 6,129,141 A * | 10/2000 | Yang | 165/45 |
| 6,253,837 B1 * | 7/2001 | Seiler et al. | 165/103 |
| 6,935,569 B2 * | 8/2005 | Brown et al. | 236/34.5 |
| 6,945,065 B2 * | 9/2005 | Lee et al. | 62/271 |
| 7,062,911 B2 * | 6/2006 | Yang | 60/641.6 |
| 7,735,546 B2 * | 6/2010 | Bird et al. | 165/297 |
| 7,946,506 B2 * | 5/2011 | Zagni et al. | 236/101 R |
| 2004/0194909 A1 * | 10/2004 | Yang | 165/11.1 |
| 2005/0006049 A1 * | 1/2005 | Ross | 165/45 |
| 2005/0203415 A1 * | 9/2005 | Garlick et al. | 600/463 |
| 2007/0023164 A1 * | 2/2007 | Kidwell et al. | 165/45 |
| 2008/0121282 A1 * | 5/2008 | Green et al. | 137/3 |
| 2008/0128526 A1 * | 6/2008 | Otake | F24H 1/208 237/2 B |

* cited by examiner

Primary Examiner — Henry Crenshaw
(74) Attorney, Agent, or Firm — Bacon & Thomas, PLLC

(57) ABSTRACT

The present invention relates to a vertical relay fluid storage barrel installed with fluid inlet and fluid outlet for whole or in part placement into natural thermal energy body in vertical or downward oblique manner, wherein a thermal energy exchanger is installed inside the relay fluid storage barrel temporarily storing thermal conductive fluid for external flow, the thermal energy exchanger is installed with fluid piping for the thermal conductive fluid passing through, to perform heat exchange with the fluid in the relay fluid storage barrel, and the fluid in the relay fluid storage barrel performs heat exchange with the natural thermal energy body.

27 Claims, 15 Drawing Sheets

VERTICAL FLUID HEAT EXCHANGER INSTALLED WITHIN NATURAL THERMAL ENERGY BODY

BACKGROUND OF THE INVENTION (a) Field of the Invention

The present invention relates to a fluid heat exchanger with the form of vertical relay fluid storage barrel installed with at least one fluid inlet and at least one fluid outlet for being close installed, or whole or in part placement into natural thermal energy body in vertical or downward oblique manner, wherein a thermal energy exchanger is installed inside the structure of the relay fluid storage barrel temporarily storing thermal conductive fluid for external flow, such as tap-water, or water from rivers, lakes or sea, for performing the function of auxiliary water storage barrel installed at shallow thermal energy body, the thermal energy exchanger is installed with at least one fluid piping for the thermal conductive fluid passing through, to perform heat exchange with the fluid in the relay fluid storage barrel, and the fluid in the relay fluid storage barrel performs heat exchange with the thermal energy of the natural thermal energy body, such as soil of shallow surface of the earth, or lakes, rivers, or sea, or artificial fluid storage facilities of ponds, reservoirs, or fluid pools.

(b) Description of the Prior Art

The conventional embedded vertical relay fluid storage barrel installed at natural thermal energy body, such as soil of shallow surface of the earth, or lakes, rivers, or sea, or artificial fluid storage facilities of ponds, reservoirs, or fluid pools, is usually constituted by rod structure in solid, and only the rod structural body performs heat exchange through transmitting thermal energy of the natural thermal energy body to fluid piping installed inside the rod structural body with the shortages of small value and slow speed of heat exchange.

SUMMARY OF THE INVENTION

The present invention relates to a fluid heat exchanger with the form of vertical relay fluid storage barrel for being close installed, or whole or in part placement into natural thermal energy body installed in soil of shallow surface of the earth, or lakes, rivers, or sea, or artificial fluid storage facilities of ponds, reservoirs, or fluid pools, in vertical or downward oblique manner, wherein the relay fluid storage barrel is installed with at least one fluid inlet and at least one fluid outlet, a thermal energy exchanger is installed inside the structure of the relay fluid storage barrel temporarily storing thermal conductive fluid for external flow, such as tap-water, or water from rivers, lakes or sea, for performing the function of auxiliary water storage barrel installed at shallow thermal energy body, the thermal energy exchanger is installed with at least one fluid piping for the thermal conductive fluid passing through, to perform heat exchange with the fluid in the relay fluid storage barrel, and the fluid in the relay fluid storage barrel performs heat exchange with the thermal energy of the natural thermal energy body, such as soil of shallow surface of the earth, or lakes, rivers, or sea, or artificial fluid storage facilities of ponds, reservoirs, or fluid pools; the thermal conductive fluid in the relay fluid storage barrel, such as tap-water, or water from rivers, lakes or sea, can be randomly pumped to form an open flow path system, or the system can be kept random pumping facilities and be additionally installed with pumps (including a common pump and making choice of pumped fluid flow by a switch valve), to pump the thermal conductive fluid in the relay fluid storage barrel to the source of the thermal conductive fluid to form a semi-open flow path system, or the system can be only installed with pumps, but without random pumping facilities, to pump the thermal conductive fluid in the relay fluid storage barrel to the upstream source of the thermal conductive fluid to form a closed flow path system.

Figure 1:
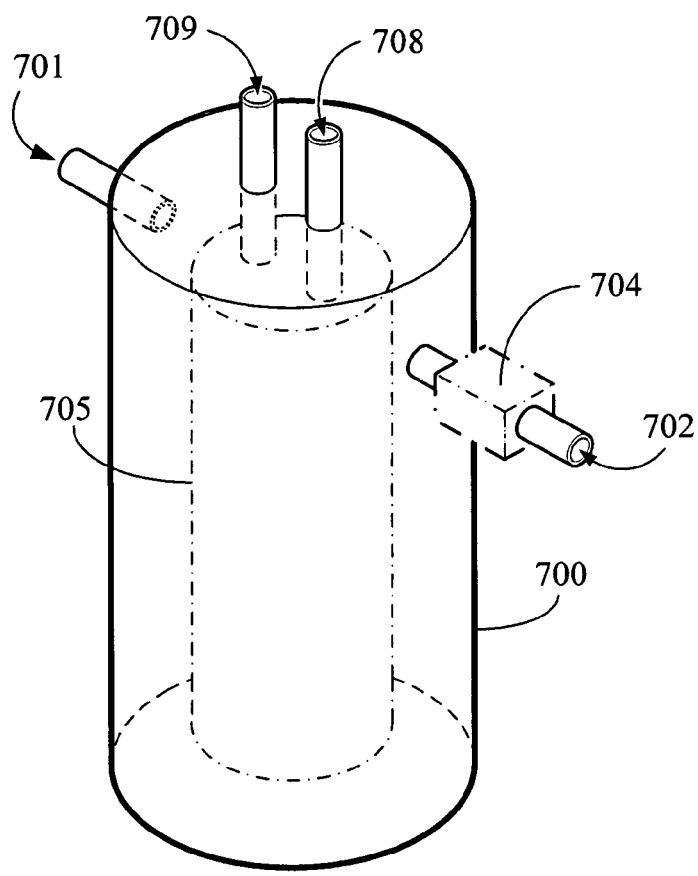
FIG. 1 is a three-dimensional schematic view showing the basic structure of the present invention.

DESCRIPTION OF MAIN COMPONENT SYMBOLS (700): Relay fluid storage barrel
(701), (708), (708'): Fluid inlet
(702), (709), (709'): Fluid outlet
(702'): Backflow fluid outlet
(703): Switch valve
(704), (714), (724): Pump
(705): Thermal energy exchanger
(710), (801), (802): Controllable valve
(720): Ventilation piping
(723): Fluid port
(725): Ventilation switch valve
(730), (730'): Flow guiding structure for guiding the flow of internal fluid to flow from top to bottom
(750): Backflow piping
(800): With-flow piping
(810): Fluid piping
(820), (830): Auxiliary fluid piping
(850): Secondary segment fluid storage facilities
(900): Fluid source
(1000): Natural thermal energy body
(1200): Cooling tower
(1201): High temperature water inlet
(1202): Cooling water outlet
(1500): Air-conditioning device
(2000): Control device
(3000): External conduit
(7050): Combined thermal energy exchanger

DETAILED DESCRIPTION OF THE PREFERRED EMBODIMENTS

The conventional embedded vertical relay fluid storage barrel installed at natural thermal energy body, such as soil of shallow surface of the earth, or lakes, rivers, or sea, or artificial fluid storage facilities of ponds, reservoirs, or fluid pools, is usually constituted by rod structure in solid, and only the rod structural body performs heat exchange through transmitting thermal energy of the natural thermal energy body to fluid piping installed inside the rod structural body with the shortages of small value and slow speed of heat exchange.

The present invention relates to a vertical fluid heat exchanger installed within natural thermal energy body, mainly to a fluid heat exchanger with the form of vertical relay fluid storage barrel for being close installed, or whole or in part placement into natural thermal energy body installed in soil of shallow surface of the earth, or lakes, rivers, or sea, or artificial fluid storage facilities of ponds, reservoirs, or fluid pools, in vertical or downward oblique manner, wherein the relay fluid storage barrel is installed with at least one fluid inlet and at least one fluid outlet, a thermal energy exchanger is installed inside the structure of the relay fluid storage barrel temporarily storing thermal conductive fluid for external flow, such as tap-water, or water from rivers, lakes or sea, for performing the function of auxiliary water storage barrel installed at shallow thermal energy body, the thermal energy exchanger is installed with at least one fluid piping for the thermal conductive fluid passing through, to perform heat exchange with the fluid in the relay fluid storage barrel, and the fluid in the relay fluid storage barrel performs heat exchange with the thermal energy of the natural thermal energy body, such as soil of shallow surface of the earth, or lakes, rivers, or sea, or artificial fluid storage facilities of ponds, reservoirs, or fluid pools; the thermal conductive fluid in the relay fluid storage barrel, such as tap-water, or water from rivers, lakes or sea, can be randomly pumped to form an open flow path system, or the system can be kept random pumping facilities and be additionally installed with pumps (including a common pump and making choice of pumped fluid flow by a switch valve), to pump the thermal conductive fluid in the relay fluid storage barrel to the source of the thermal conductive fluid to form a semi-open flow path system, or the system can be only installed with pumps, but without random pumping facilities, to pump the thermal conductive fluid in the relay fluid storage barrel to the upstream source of the thermal conductive fluid to form a closed flow path system.

Figure 2:
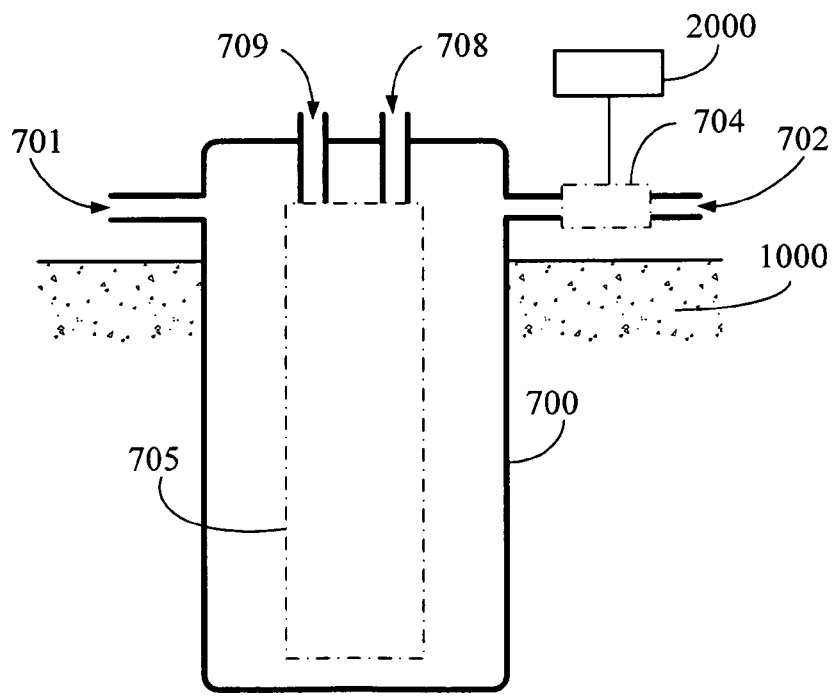
FIG. 2 is a sectional view of FIG. 1.
Figure 3:
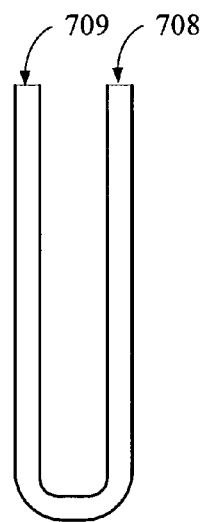
FIG. 3 is a structural schematic view of an embodiment, showing a thermal energy exchanger (705) constituted by U-type piping, according to the present invention.
Figure 4:
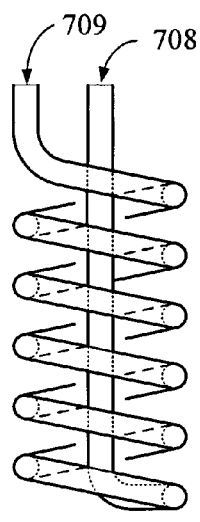
FIG. 4 is a structural schematic view of an embodiment, showing the thermal energy exchanger (705) constituted by spiral piping, according to the present invention.
Figure 5:
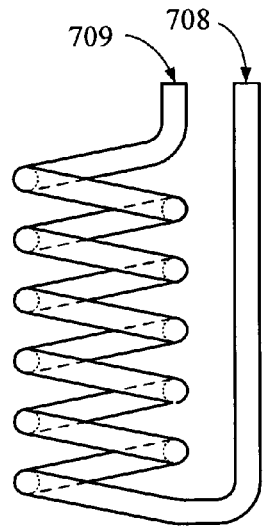
FIG. 5 is a structural schematic view of an embodiment, showing the thermal energy exchanger (705) constituted by wavy piping, according to the present invention.
Figure 6:
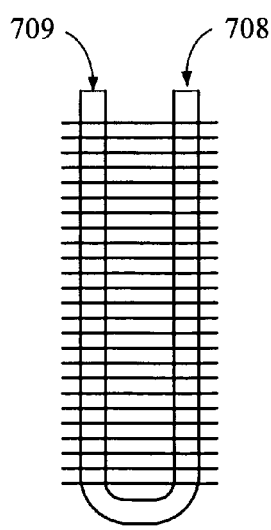
FIG. 6 is a structural schematic view of an embodiment, showing the thermal energy exchanger (705) constituted by U-type piping additionally installed with thermal conductive fins, according to the present invention.
Figure 7:
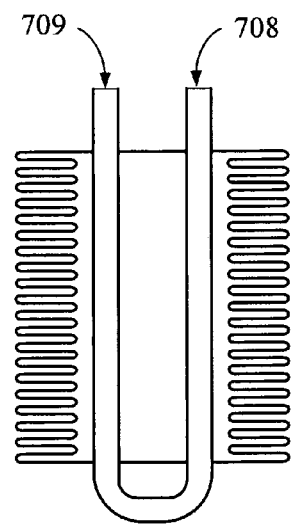
FIG. 7 is a structural schematic view of an embodiment, showing the thermal energy exchanger (705) constituted by a thermal conductive structural body inside installed with flow paths, according to the present invention.

For the vertical fluid heat exchanger installed within natural thermal energy body, the basic structure and operation are explained as following:

FIG. 1 is a three-dimensional schematic view showing the basic structure of the present invention, and FIG. 2 is a sectional view of FIG. 1. As shown in FIG. 1 and FIG. 2, the main components include:

Relay fluid storage barrel (700): made of thermal conductive material to be integrated or combined, wherein the relay fluid storage barrel (700) is a fluid heat exchanger with the form of vertical relay fluid storage barrel for being close installed, or whole or in part placement into natural thermal energy body (1000) in vertical or downward oblique manner, and the relay fluid storage barrel (700) is installed with at least one fluid inlet (701) and at least one fluid outlet (702) for fluid entering and leaving to perform fluid exchange function; in which the fluid inlet (701) is installed at the position lower than that of the relay fluid storage barrel (700), and the fluid outlet (702) is installed at the position higher than that of the relay fluid storage barrel (700), or vice versa, to prevent the fluid at lower part within the relay fluid storage barrel (700) from stagnation; and wherein the fluid passing through the relay fluid storage barrel (700) is controlled by human or by control device (2000) for pumping or pump-priming, by way of external pressure, or gravity with potential difference, or a pump (704) being installed at the fluid inlet (701) and/or the fluid outlet (702), to drive the fluid in liquid state, or gaseous state, or liquid to gaseous state, or gaseous to liquid state for pumping, or stop, or adjustment of pumping flow rate;

one or more thermal energy exchangers (705) related to fluid by fluid are installed inside the relay fluid storage barrel (700);

the thermal energy exchanger (705) has independent flow paths for fluid passing through, to perform heat exchange with the fluid in the relay fluid storage barrel (700); the thermal energy exchanger (705) is directly constituted by the structure of tubular flow paths in a variety of geometric shapes, including U-type fluid piping (such as FIG. 3 is a structural schematic view of an embodiment, showing the thermal energy exchanger (705) constituted by U-type piping, according to the present invention;), or spiral fluid piping (such as FIG. 4 is a structural schematic view of an embodiment, showing the thermal energy exchanger (705) constituted by spiral piping, according to the present invention;), or wavy fluid piping (such as FIG. 5 is a structural schematic view of an embodiment, showing the thermal energy exchanger (705) constituted by wavy piping, according to the present invention;), and/or the thermal energy exchanger (705) is constituted by U-type piping additionally installed with thermal conductive fins (such as FIG. 6 is a structural schematic view of an embodiment, showing the thermal energy exchanger (705) constituted by U-type piping additionally installed with thermal conductive fins, according to the present invention;), and the above thermal energy exchangers (705) in various shapes are installed with fluid inlet (708) and fluid outlet (709);

the thermal energy exchanger (705) is directly constituted by a thermal conductive structural body inside installed with flow paths and installed with the fluid inlet (708) and the fluid outlet (709), and/or thermal conductive fins extended from the thermal conductive structural body (such as FIG. 7 is a structural schematic view of an embodiment, showing the thermal energy exchanger (705) constituted by a thermal conductive structural body inside installed with flow paths, according to the present invention;);

the individual fluid pathway of the thermal energy exchanger (705) is installed with fluid inlet and fluid outlet; and the fluid passing through the fluid pathway of the thermal energy exchanger (705) is controlled for pumping or pump-priming, by way of external pressure, or gravity with potential difference, or a pump being installed, to individually drive the same or different fluid in liquid state, or gaseous state, or liquid to gaseous state, or gaseous to liquid state; and Control device (2000): related to control device activated by electrical force, mechanical force, current force, or magnetic force, for controlling the pump (704), wherein the control device (2000) and the pump (704) are installed simultaneously.

For the vertical fluid heat exchanger installed within natural thermal energy body, there are one or more cylindrical relay fluid storage barrels (700) inside installed with the thermal energy exchanger (705), and if two or more relay fluid storage barrels (700) exist, the fluid pathways in the individual relay fluid storage barrel (700) are series connection, parallel connection, or series-parallel connection; wherein the different relay fluid storage barrels (700) individually operate for same or different types fluids passing through;

there are one or divided into more than one fluid pathways within the relay fluid storage barrel (700), and if divided into two or more fluid pathways exist, individual flow path is installed with fluid inlet and fluid outlet;

if there are two or more fluid pathways within the relay fluid storage barrel (700), individual fluid pathway individually operates for same or different types fluids passing through; and if there are two or more fluid pathways within the relay fluid storage barrel (700), the fluid pathways are series connection, parallel connection, or series-parallel connection.

For the vertical fluid heat exchanger installed within natural thermal energy body, the thermal energy exchanger (705) is directly constituted by at least two crossed U-type fluid piping, in which one fluid pathway is installed with the fluid inlet (708) and the fluid outlet (709), and another fluid pathway is installed with fluid inlet (708') and fluid outlet (709').

Figure 8:
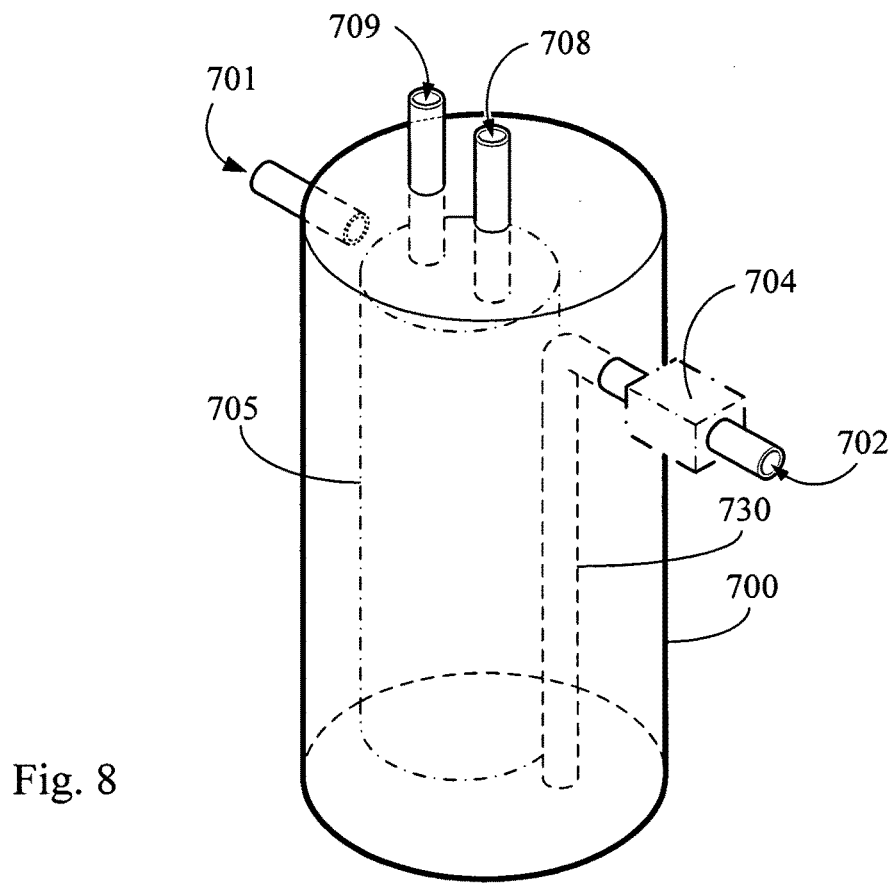
FIG. 8 is a structural schematic view of an embodiment, showing that a fluid inlet (701) and a fluid outlet (702) are placed at upper part in a relay fluid storage barrel (700), wherein flow guiding structure (730) for guiding the flow of internal fluid to flow from top to bottom is placed inside the relay fluid storage barrel (700) to connect the fluid inlet (701) and/or the fluid outlet (702), according to the present invention.
Figure 9:
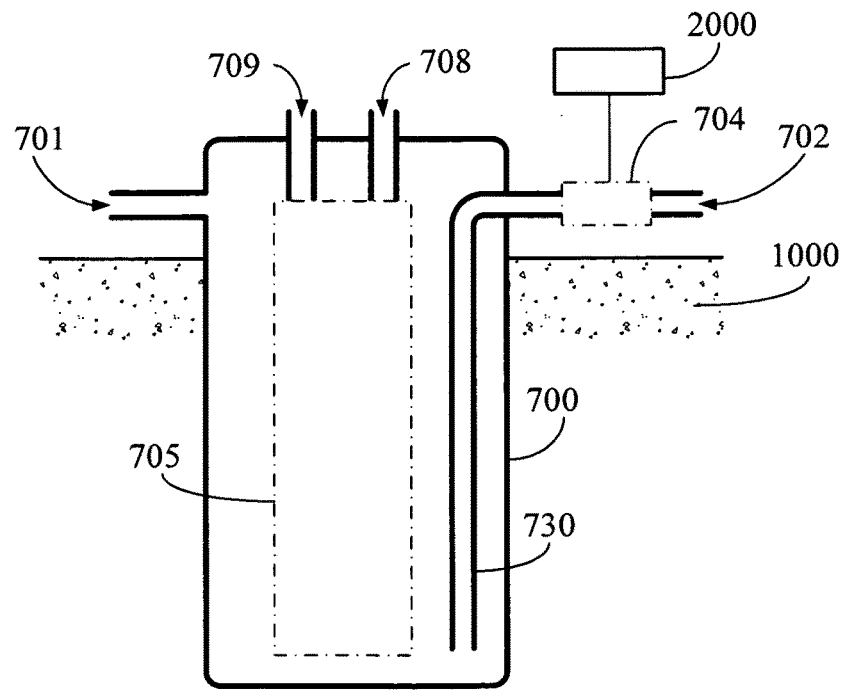
FIG. 9 is a sectional view of FIG. 8.
Figure 10:
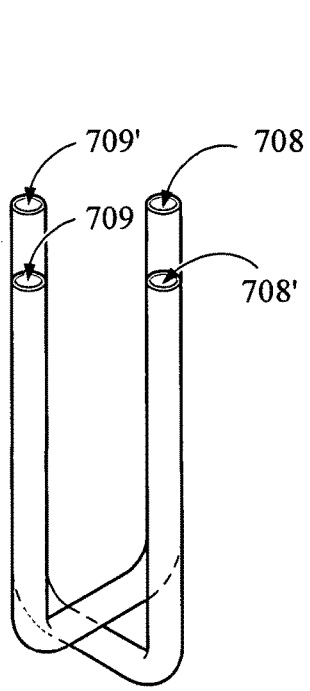
FIG. 10 is a structural schematic view of an embodiment, showing that a combined thermal energy exchanger (7050) is constituted by two crossed U-type piping with 90 degrees difference, according to the present invention.
Figure 11:
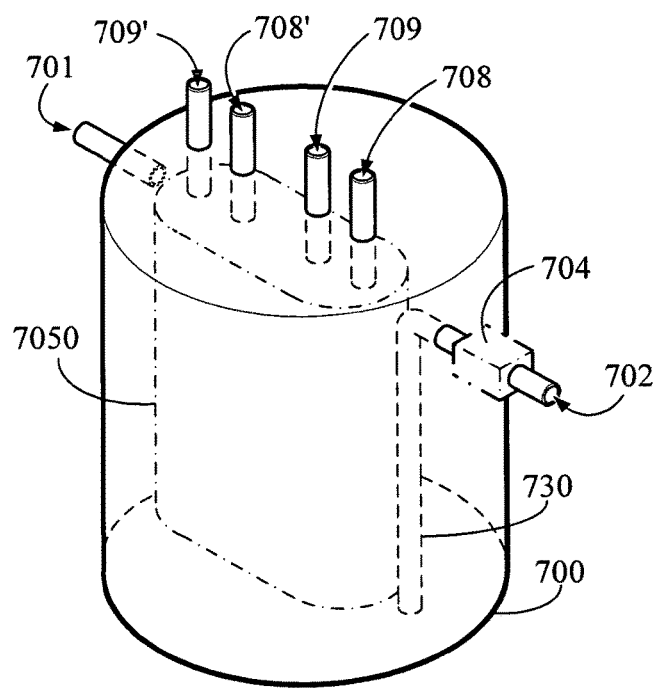
FIG. 11 is a structural schematic view of an embodiment, showing that the same combined thermal energy exchanger (7050) within the relay fluid storage barrel (700) is installed with two fluid pathways, according to the present invention.
Figure 12:
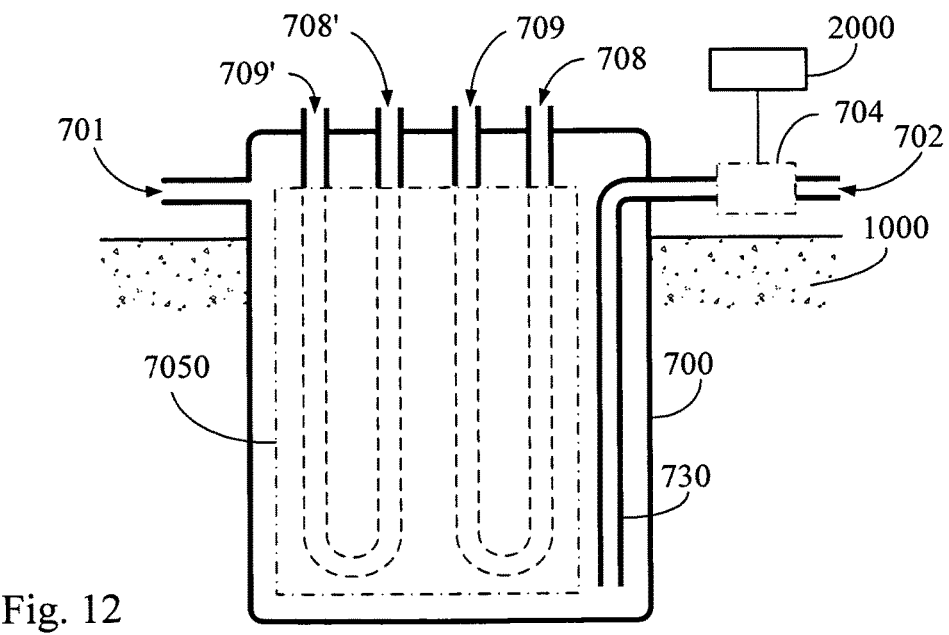
FIG. 12 is a sectional view of FIG. 11.
Figure 13:
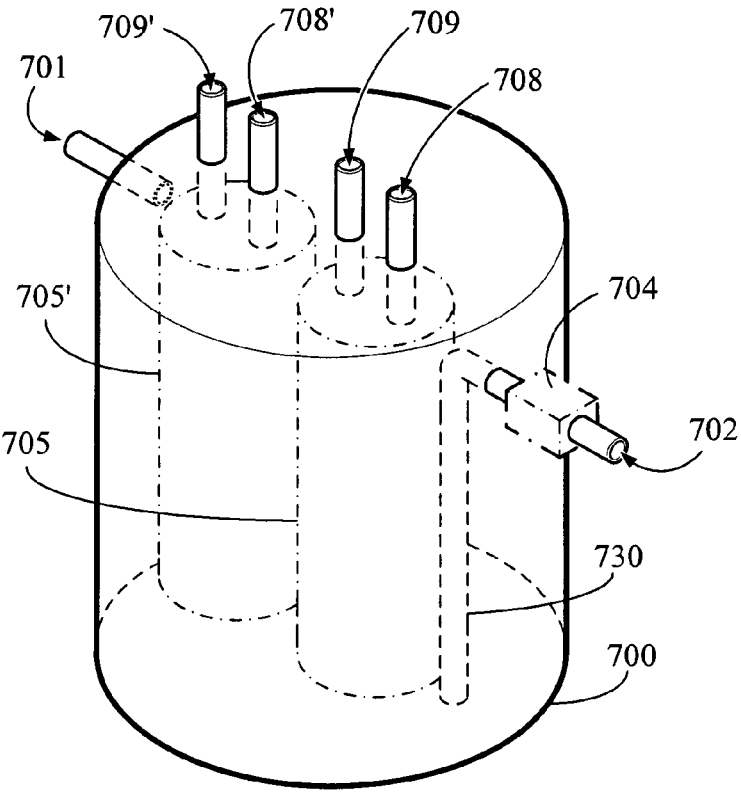
FIG. 13 is a structural schematic view of an embodiment, showing that two or more thermal energy exchangers (705) are installed within the same relay fluid storage barrel (700), according to the present invention.
Figure 14:
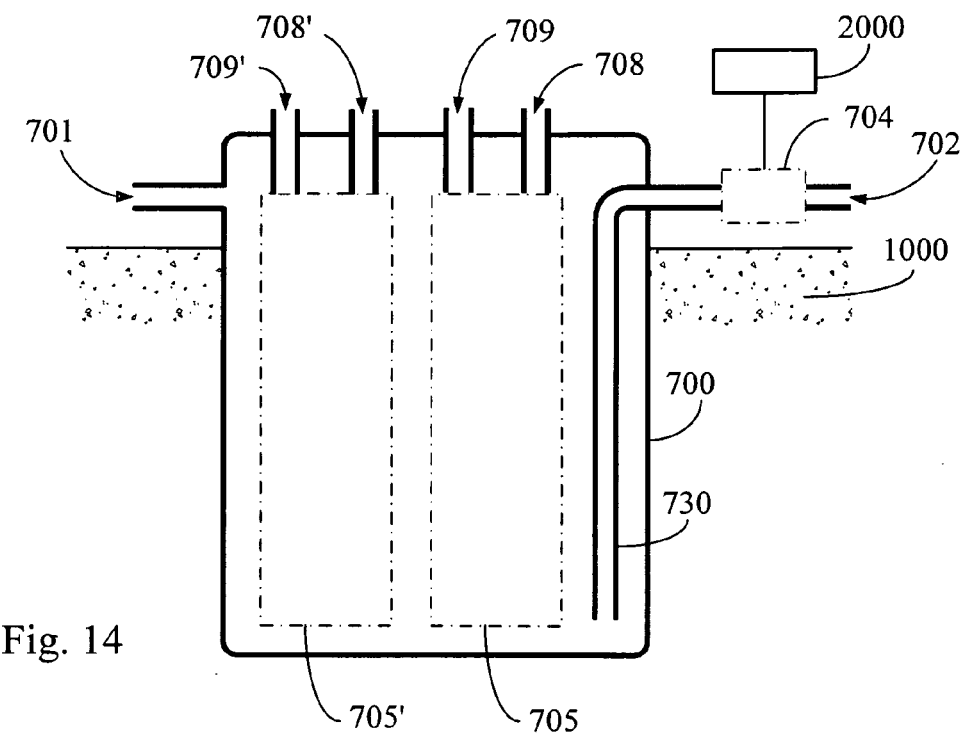
FIG. 14 is a sectional view of FIG. 13.

For the vertical fluid heat exchanger installed within natural thermal energy body, the fluid inlet (701) and the fluid outlet (702) are further installed at upper part within the relay fluid storage barrel (700) to facilitate maintenance, and flow guiding structure (730) for guiding the flow of internal fluid to flow from top to bottom is placed inside the relay fluid storage barrel (700) to connect the fluid inlet (701) and/or the fluid outlet (702), for ensuring the flow path between the fluid inlet (701) and the fluid outlet (702)

passing through the bottom of the relay fluid storage barrel (700) to prevent the fluid at lower part within the relay fluid storage barrel (700) from stagnation; (such as FIG. 8 is a structural schematic view of an embodiment, showing that a fluid inlet (701) and a fluid outlet (702) are placed at upper part in a relay fluid storage barrel (700), wherein the flow guiding structure (730) for guiding the flow of internal fluid to flow from top to bottom is placed inside the relay fluid storage barrel (700) to connect the fluid inlet (701) and/or the fluid outlet (702), according to the present invention; and FIG. 9 is a sectional view of FIG. 8;); wherein the fluid pathways of the same combined thermal energy exchanger (7050) in the same relay fluid storage barrel (700) include two or more U-type piping, which are parallel and side by side, parallel and stacked, or crossed with angle difference, (such as FIG. 10 is a structural schematic view of an embodiment, showing that the combined thermal energy exchanger (7050) is constituted by two crossed U-type piping with 90 degrees difference, according to the present invention;) and if two or more fluid pathways exist, individual fluid pathway is installed with fluid inlet and fluid outlet, and individually operates for same or different types fluids passing through; (such as FIG. 11 is a structural schematic view of an embodiment, showing that the same combined thermal energy exchanger (7050) within the relay fluid storage barrel (700) is installed with two fluid pathways, according to the present invention; and FIG. 12 is a sectional view of FIG. 11;) and if there are two or more fluid pathways of the same combined thermal energy exchanger (7050) in the same relay fluid storage barrel (700), the fluid pathways are series connection, parallel connection, or series-parallel connection;

if two or more thermal energy exchangers (705) are installed within the same relay fluid storage barrel (700), the individual thermal energy exchanger (705) includes one or more fluid pathways respectively installed with fluid inlet and fluid outlet, and individual fluid pathway individually operates for same or different types fluids passing through; (such as FIG. 13 is a structural schematic view of an embodiment, showing that two or more thermal energy exchangers (705) are installed within the same relay fluid storage barrel (700), according to the present invention; and FIG. 14 is a sectional view of FIG. 13;);

if there are two or more thermal energy exchangers (705) installed inside the same relay fluid storage barrel (700), the fluid pathways of the individual thermal energy exchanger (705) are series connection, parallel connection, or series-parallel connection;

the fluid pathways of the thermal energy exchangers (705) installed within the different relay fluid storage barrels (700) individually operate;

same or different types fluids pass through the individual fluid pathway of the thermal energy exchangers (705) within the different relay fluid storage barrels (700);

the fluid pathways of the thermal energy exchangers (705) within the different relay fluid storage barrels (700) are series connection, parallel connection, or series-parallel connection; and the fluids passing through the piping of the thermal energy exchangers (705) within the different relay fluid storage barrels (700) are controlled by human or by the control device (2000) for pumping or pump-priming, by way of external pressure, or gravity with potential difference, or the pump (714) being installed, to drive the fluids in liquid state, or gaseous state, or liquid to gaseous state, or gaseous to liquid state.

Figure 15:
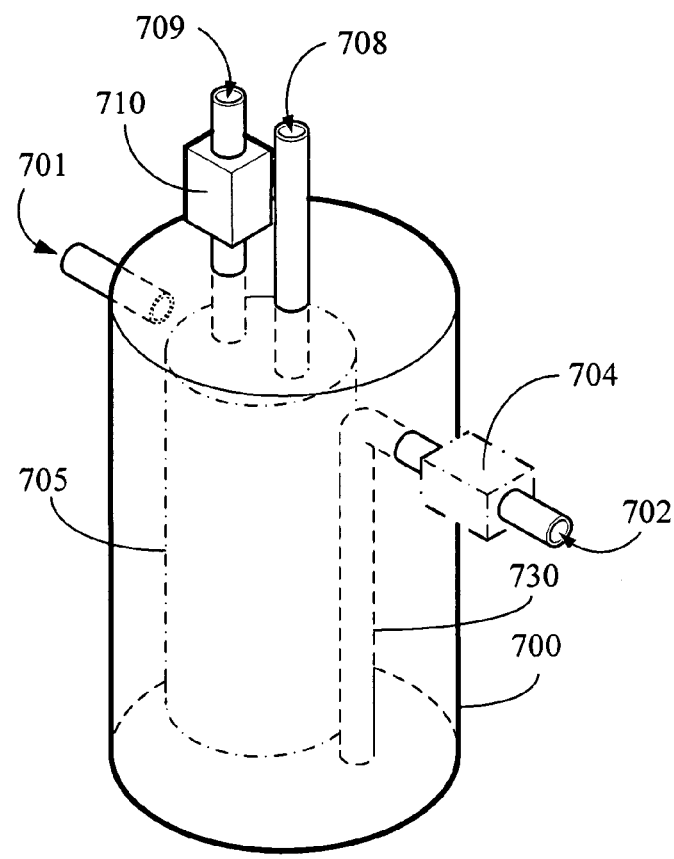
FIG. 15 is a structural schematic view of an embodiment, showing that a fluid inlet (708) and/or a fluid outlet (709) of the fluid pathway in the thermal energy exchanger (705) are installed with a switch valve (710), according to the present invention.
Figure 16:
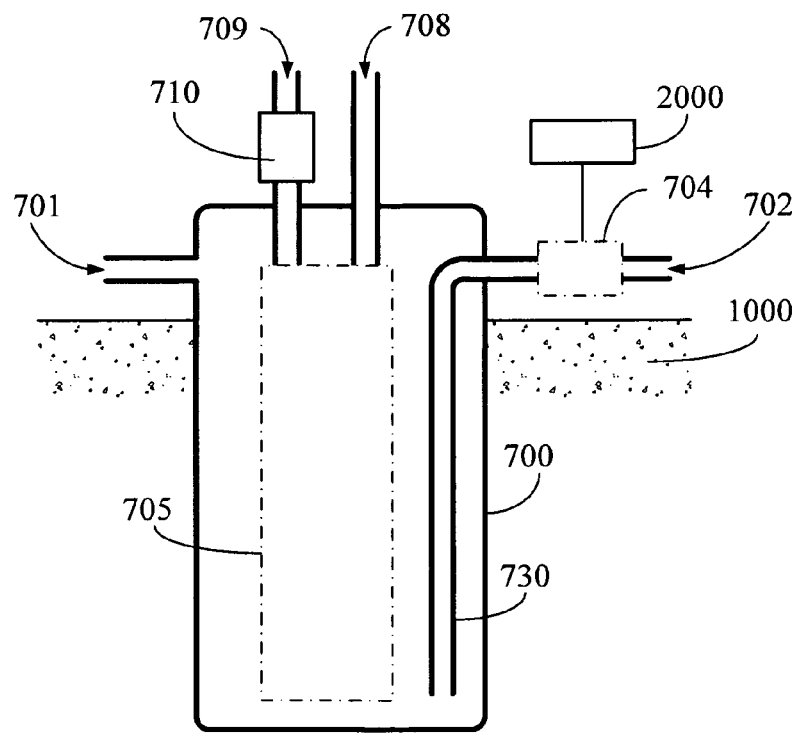
FIG. 16 is a sectional view of FIG. 15.

For the above thermal energy exchanger (705), the fluid inlet (708) and/or the fluid outlet (709) of the fluid pathway are installed with a switch valve (710) (such as FIG. 15 is a structural schematic view of an embodiment, showing that the fluid inlet (708) and/or the fluid outlet (709) of the fluid pathway in the thermal energy exchanger (705) are installed with the switch valve (710), according to the present invention; and FIG. 16 is a sectional view of FIG. 15;).

As shown in FIG. 15 and FIG. 16, the fluid inlet (708) and/or the fluid outlet (709) of the fluid pathway in the thermal energy exchanger (705) are installed with the controllable valve (710) for control regulation of the fluid entering the fluid pathway in the thermal energy exchanger (705).

For the vertical fluid heat exchanger installed within natural thermal energy body, the barrel cross-section shapes of the relay fluid storage barrels (700) include circular, oval, star, or other shapes.

The shapes of the relay fluid storage barrels (700) include parallel rods or non-parallel rods.

Figure 17:
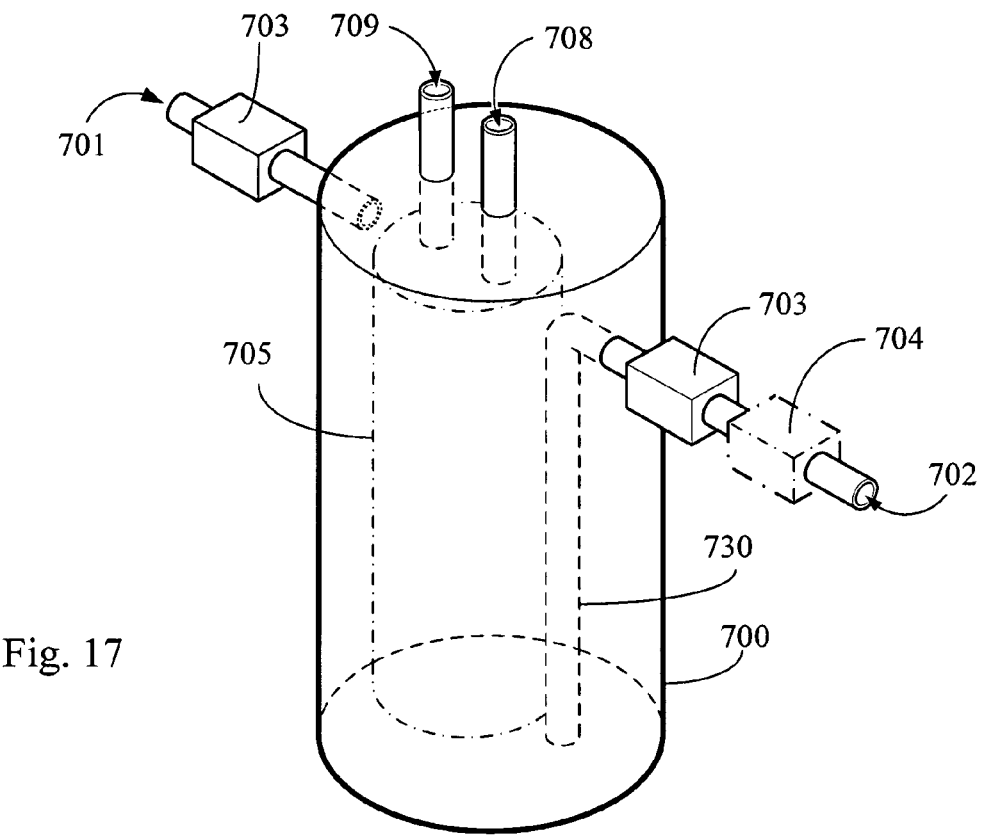
FIG. 17 is a structural schematic view of an embodiment, showing that the fluid inlet (701) and/or the fluid outlet (702) of the relay fluid storage barrel (700) are installed with a switch valve (703), according to the present invention.
Figure 18:
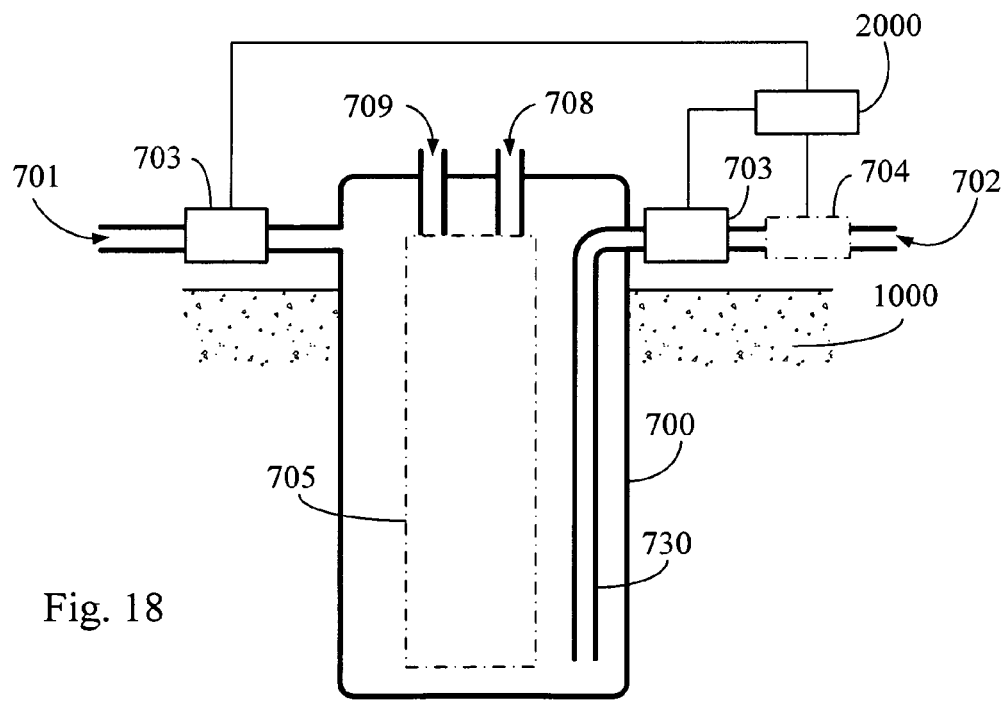
FIG. 18 is a sectional view of FIG. 17.

For the relay fluid storage barrels (700), the fluid inlet (701) and/or the fluid outlet (702) are installed with a switch valve (703) to control the switch valve (703) by human or by the control device (2000) for opening, or closing, or adjustment of flow rate, and to control the pump (704) for pumping, or stop, or adjustment of pumping flow rate; the control device (2000) is control device activated by electrical force, mechanical force, current force, or magnetic force (such as FIG. 17 is a structural schematic view of an embodiment, showing that the fluid inlet (701) and/or the fluid outlet (702) of the relay fluid storage barrel (700) are installed with the switch valve (703), according to the present invention; and FIG. 18 is a sectional view of FIG. 17;).

Figure 19:
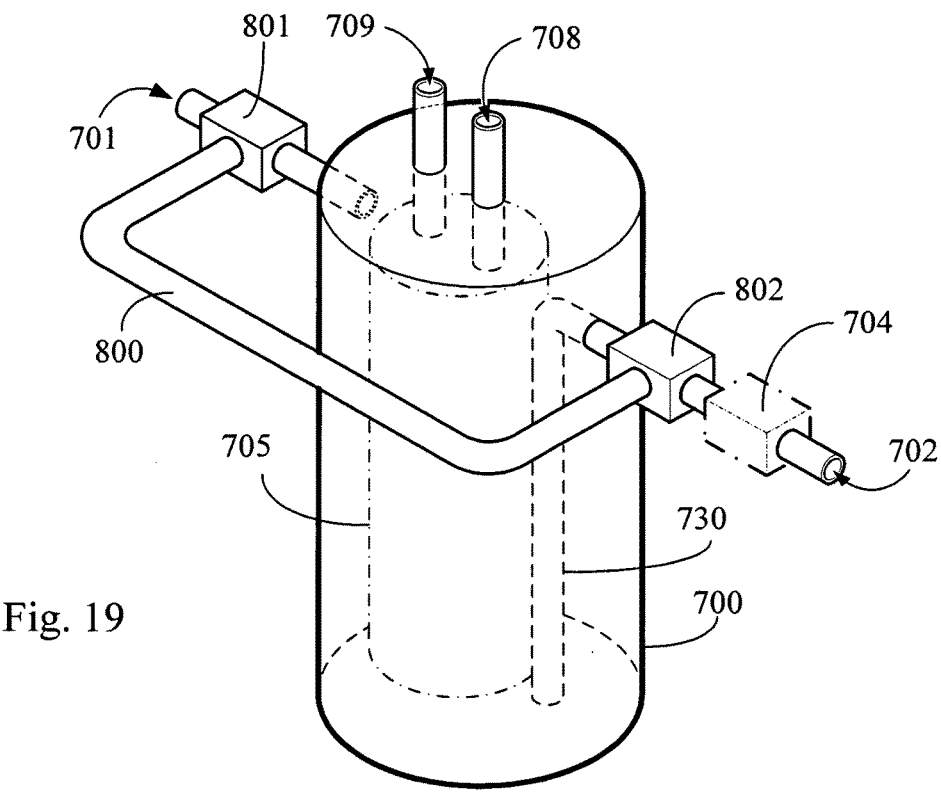
FIG. 19 is a structural schematic view of an embodiment, showing that a controllable valve (801) is installed at the fluid inlet (701) and/or a controllable valve (802) is installed at the fluid outlet (702), and with-flow piping (800) is installed between the controllable valve (801) and the controllable valve (802), within the relay fluid storage barrel (700), according to the present invention.
Figure 20:
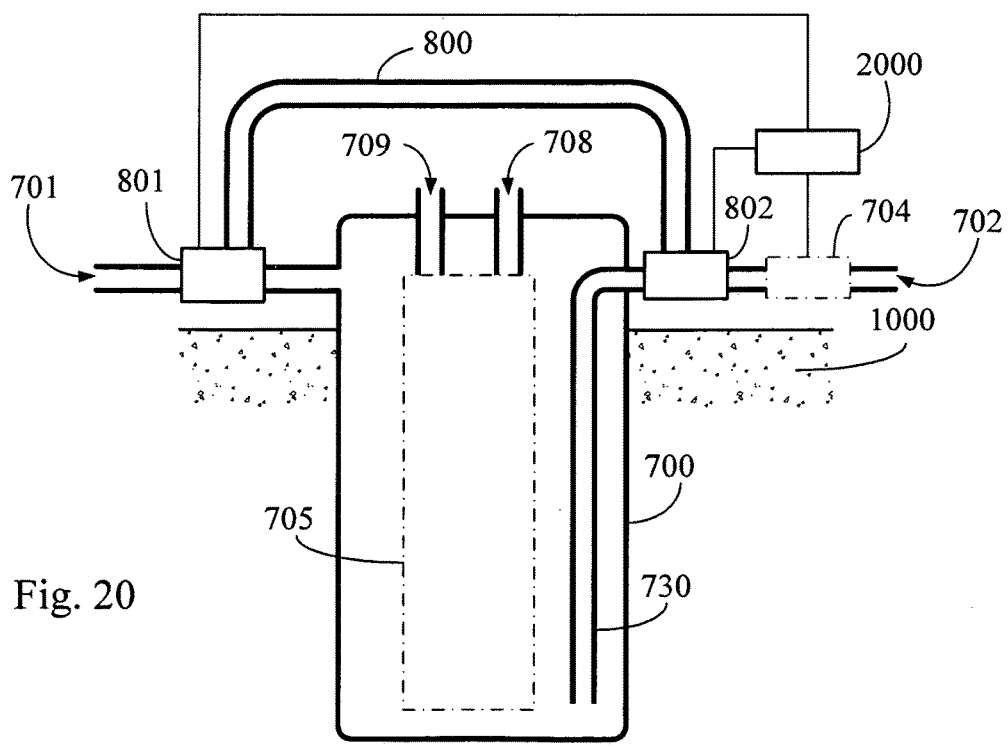
FIG. 20 is a sectional view of FIG. 19.

For the relay fluid storage barrels (700), a controllable valve (801) is installed at the fluid inlet (701) and/or a controllable valve (802) is installed at the fluid outlet (702), and with-flow piping (800) is installed between the controllable valve (801) and the controllable valve (802) to regulate the fluid flow rate entering inside the relay fluid storage barrels (700), by way of adjustment of the fluid flow rate passing through the with-flow piping, to control the controllable valve (801) and/or the controllable valve (802) by human or by the control device (2000) for opening, or closing, or adjustment of flow rate, and to control the pump (704) for pumping, or stop, or adjustment of pumping flow rate; the control device (2000) is control device activated by electrical force, mechanical force, current force, or magnetic force (such as FIG. 19 is a structural schematic view of an embodiment, showing that the controllable valve (801) is installed at the fluid inlet (701) and/or the controllable valve (802) is installed at the fluid outlet (702), and the with-flow piping (800) is installed between the controllable valve (801) and the controllable valve (802), within the relay fluid storage barrel (700), according to the present invention; and FIG. 20 is a sectional view of FIG. 19;).

As shown in FIG. 19 and FIG. 20, the controllable valves (801) and (802) and the with-flow piping (800) are controlled for one or more flow modes as following, including:

1) blocking the fluid passing through the with-flow piping (800), and then the fluid completely passing through the relay fluid storage barrel (700) for entering or leaving;

2) blocking the fluid entering into the relay fluid storage barrel (700), and then the fluid completely passing through the with-flow piping (800);

3) partial fluid entering into the relay fluid storage barrel (700), and partial fluid passing through the with-flow piping (800); and 4) adjusting the fluid flow rate entering into the relay fluid storage barrel (700), for performing the functions of opening and closing.

For the vertical fluid heat exchanger installed within natural thermal energy body, the relay fluid storage barrel (700) and/or the thermal energy exchanger (705) are constituted by integrated or combined structure to facilitate the dismantling and maintenance.

The structural cross-section shapes of the thermal energy exchanger (705) include circular, oval, star, square, or other shapes.

The shapes of the thermal energy exchanger (705) include parallel rods or non-parallel rods.

Figure 21:
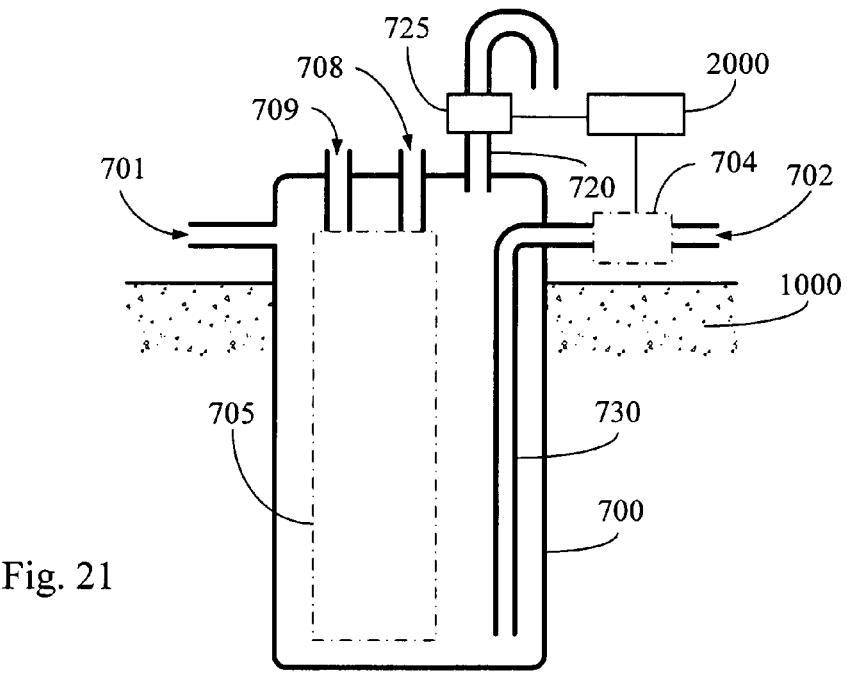
FIG. 21 is a structural schematic view of an embodiment, showing that the relay fluid storage barrel (700) is further installed with ventilation piping (720), according to the present invention.

For the vertical fluid heat exchanger installed within natural thermal energy body, the relay fluid storage barrel (700) is further installed with ventilation piping (720), the position of the ventilation piping (720) is higher than that of the fluid source to prevent fluid from overflow, and/or is further installed with a ventilation switch valve (725), if fluid does not enter the inlet, the fluid within the relay fluid storage barrel (700) will be pumped-out by the pump (704), and the ventilation switch valve (725) is controlled by human or by the control device (2000) for eliminating the negative pressure when the pump (704) is pumping-out the fluid within the relay fluid storage barrel (700), such as FIG. 21 is a structural schematic view of an embodiment, showing that the relay fluid storage barrel (700) is further installed with the ventilation piping (720), according to the present invention.

Figure 22:
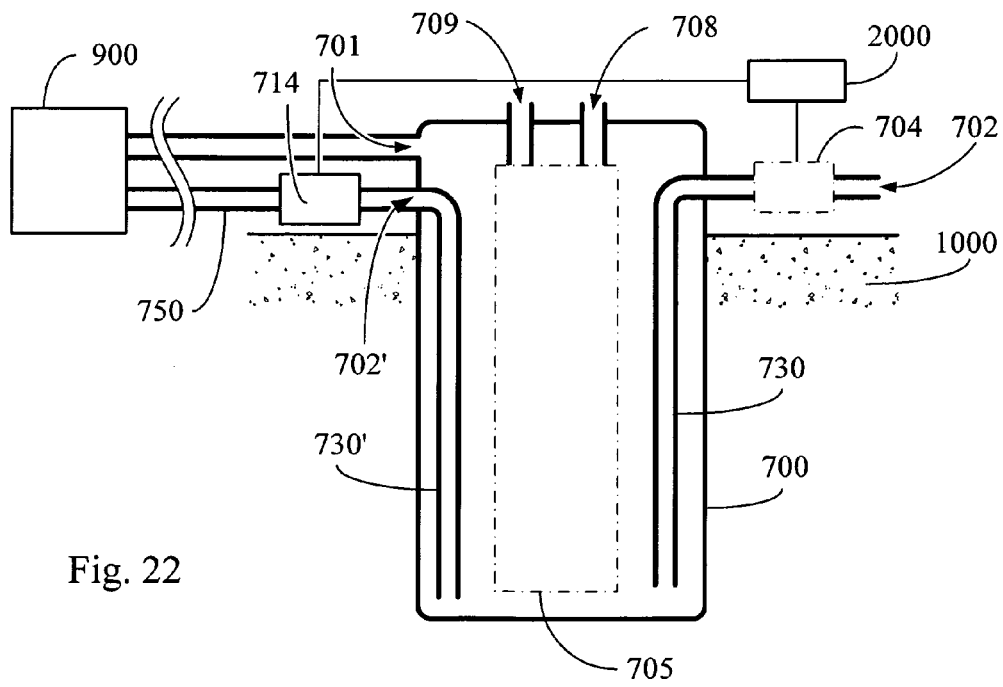
FIG. 22 is a structural schematic view of an embodiment, showing that the relay fluid storage barrel (700) is further installed with a backflow fluid outlet (702'), besides the thermal energy exchanger (705), the fluid outlet (702), and a pump (704), and backflow piping (750) connected with a pump (714) in series is installed between the backflow fluid outlet (702') and upstream fluid piping or fluid source (900), for pumping partial fluid in the relay fluid storage barrel (700) to upstream through the backflow piping (750) to form a semi-closed circuit system with thermal energy adjustment function, according to the present invention.

For the vertical fluid heat exchanger installed within natural thermal energy body, the relay fluid storage barrel (700) is further installed with a backflow fluid outlet (702'), besides the thermal energy exchanger (705), the fluid outlet (702), the pump (704), and the control device (2000), and backflow piping (750) connected with a pump (714) in series is installed between the backflow fluid outlet (702') and upstream fluid piping or fluid source (900), to control the pump (714) by human or by the control device (2000) for pumping partial fluid in the relay fluid storage barrel (700) to upstream through the backflow piping (750) to form a semi-closed circuit system with thermal energy adjustment function; if the position of the backflow fluid outlet (702') is at upper part of the relay fluid storage barrel (700), flow guiding structure (730') for guiding the flow of internal fluid to flow from top to bottom is additional placed inside the relay fluid storage barrel (700), and if the position of the backflow fluid outlet (702') is at lower part of the relay fluid storage barrel (700), the flow guiding structure (730') for guiding the flow of internal fluid to flow from top to bottom is unnecessarily placed inside the relay fluid storage barrel (700), such as FIG. 22 is a structural schematic view of an embodiment, showing that the relay fluid storage barrel (700) is further installed with the backflow fluid outlet (702'), besides the thermal energy exchanger (705), the fluid outlet (702), and the pump (704), and backflow piping (750) connected with a pump (714) in series is installed between the backflow fluid outlet (702') and upstream fluid piping or fluid source (900), for pumping partial fluid in the relay fluid storage barrel (700) to upstream through the backflow piping (750) to form a semi-closed circuit system with thermal energy adjustment function, according to the present invention.

Figure 23:
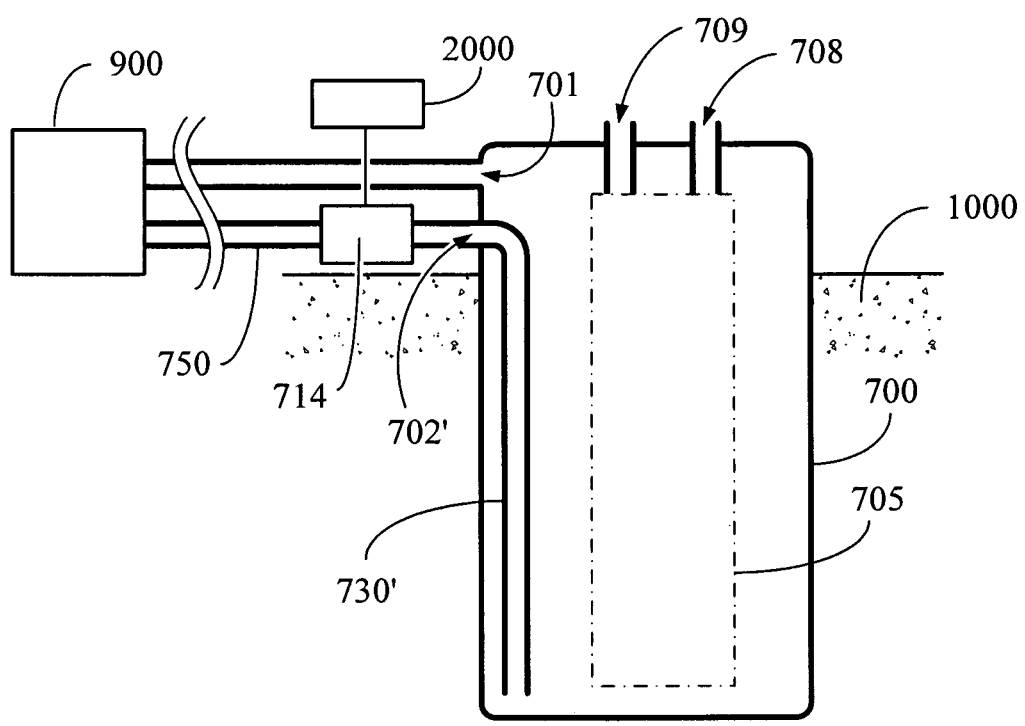
FIG. 23 is a structural schematic view of an embodiment, showing that the relay fluid storage barrel (700) is only kept the thermal energy exchanger (705), and the backflow piping (750) connected with the pump (714) in series is installed between the backflow fluid outlet (702') and upstream fluid piping or the fluid source (900), for pumping the fluid in the relay fluid storage barrel (700) to upstream through the backflow piping (750) to form a closed circuit system with thermal energy adjustment function, according to the present invention.

The relay fluid storage barrel (700) is not installed with the pump (704) and the fluid outlet (702), and is only kept the thermal energy exchanger (705), and the backflow piping (750) connected with the pump (714) in series is installed between the backflow fluid outlet (702') and upstream fluid piping or the fluid source (900), to control the pump (714) by human or by the control device (2000) for pumping the fluid in the relay fluid storage barrel (700) to upstream through the backflow piping (750) to form a closed circuit system with thermal energy adjustment function; if the position of the backflow fluid outlet (702') is at upper part of the relay fluid storage barrel (700), the flow guiding structure (730') for guiding the flow of internal fluid to flow from top to bottom is additional placed inside the relay fluid storage barrel (700), and if the position of the backflow fluid outlet (702') is at lower part of the relay fluid storage barrel (700), the flow guiding structure (730') for guiding the flow of internal fluid to flow from top to bottom is unnecessarily placed inside the relay fluid storage barrel (700), such as FIG. 23 is a structural schematic view of an embodiment, showing that the relay fluid storage barrel (700) is only kept the thermal energy exchanger (705), and the backflow piping (750) connected with the pump (714) in series is installed between the backflow fluid outlet (702') and upstream fluid piping or the fluid source (900), for pumping the fluid in the relay fluid storage barrel (700) to upstream through the backflow piping (750) to form a closed circuit system with thermal energy adjustment function, according to the present invention.

Figure 24:
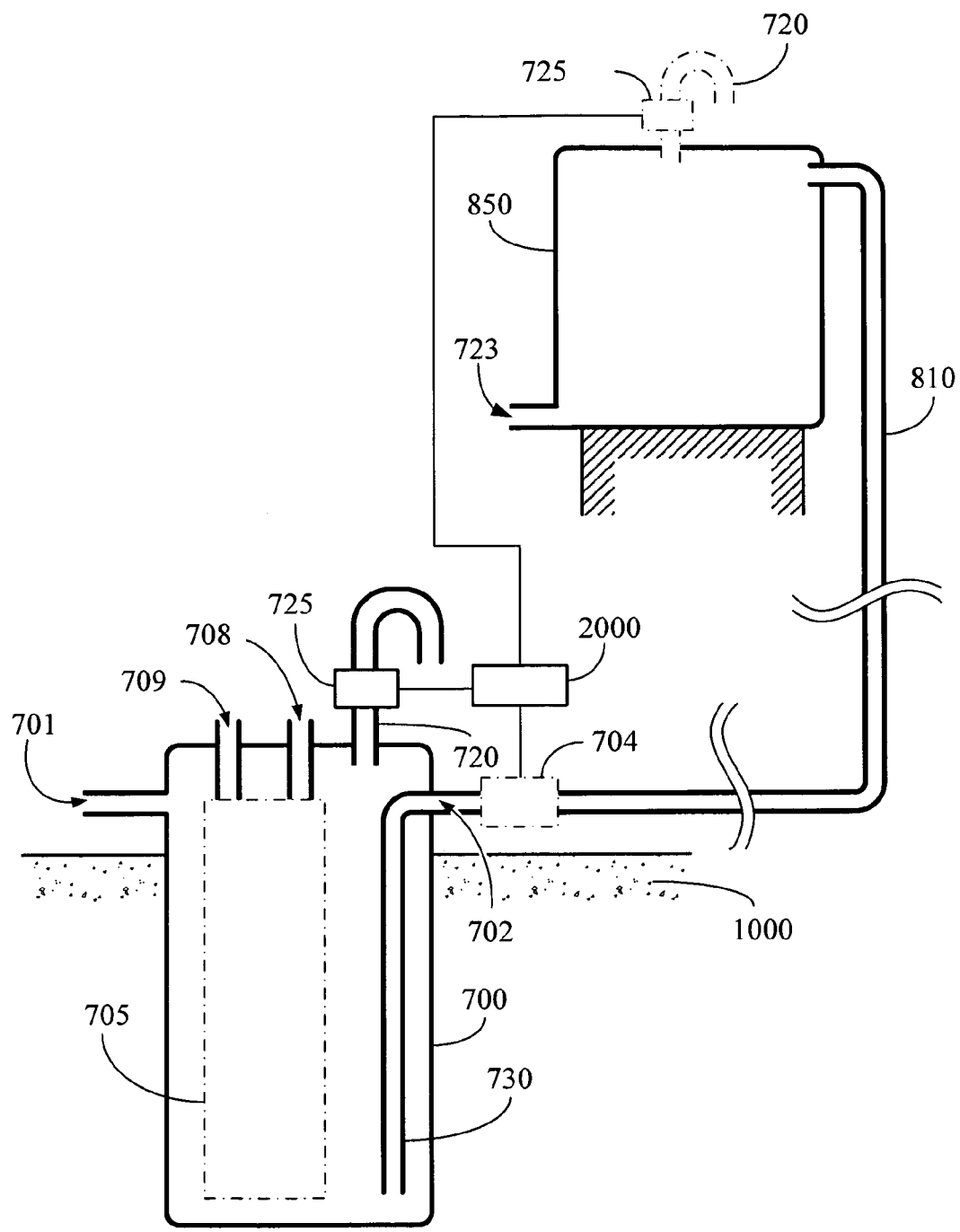
FIG. 24 is a structural schematic view of an embodiment, showing that secondary segment fluid storage facilities (850) is installed at the position higher than that of the relay fluid storage barrel (700), for storing the fluid pumped by the pump (704) through fluid piping (810), according to the present invention.

For the vertical fluid heat exchanger installed within natural thermal energy body, secondary segment fluid storage facilities (850) is further installed at the position higher than that of the relay fluid storage barrel (700), for storing the fluid pumped by the pump (704) through fluid piping (810), in which the secondary segment fluid storage facilities (850) is the semi-closed or full-closed type fluid terminal storage facilities (850), and/or which is installed with a fluid port (723) for fluid external flow, and/or the ventilation piping (720) and/or the ventilation switch valve (725) are installed at the top of the fluid terminal storage facilities (850), such as FIG. 24 is a structural schematic view of an embodiment, showing that the secondary segment fluid storage facilities (850) is installed at the position higher than that of the relay fluid storage barrel (700), for storing the fluid pumped by the pump (704) through fluid piping (810), according to the present invention.

Figure 25:
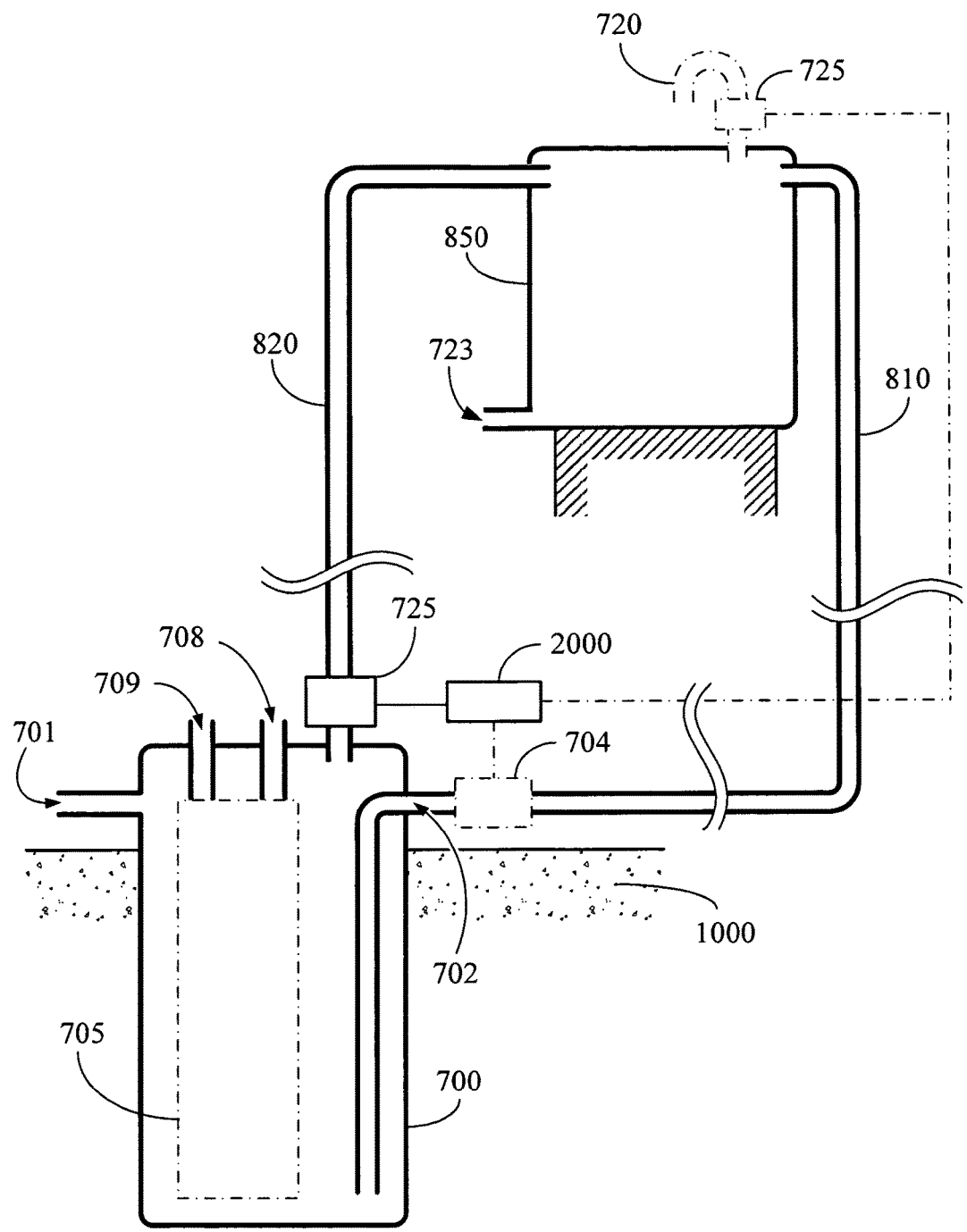
FIG. 25 is a structural schematic view of an embodiment, showing that the secondary segment fluid storage facilities (850) is installed at the position higher than that of the relay fluid storage barrel (700), for storing the fluid pumped by the pump (704) through the fluid piping (810), the secondary segment fluid storage facilities (850) is the fluid terminal storage facilities, or which is installed with a fluid port (723) for fluid external flow, and auxiliary fluid piping (820) is installed between the relay fluid storage barrel (700) and the secondary segment fluid storage facilities (850), according to the present invention.

For the vertical fluid heat exchanger installed within natural thermal energy body, the secondary segment fluid storage facilities (850) is further installed at the position higher than that of the relay fluid storage barrel (700), for storing the fluid pumped by the pump (704), which is controlled by human or by the control device (2000), and pumped into the secondary segment fluid storage facilities (850) through the fluid piping (810), in which the secondary segment fluid storage facilities (850) is the semi-closed or full-closed type fluid terminal storage facilities, and/or which is installed with the fluid port (723) for fluid external flow; the secondary segment fluid storage facilities (850) is enclosed or non-closed structure, and/or which is installed with the ventilation piping (720) or the ventilation switch valve (725), and auxiliary fluid piping (820) is installed between the relay fluid storage barrel (700) and the secondary segment fluid storage facilities (850), in place of the ventilation piping (720) of the relay fluid storage barrel (700), and/or the ventilation piping (720) and/or the ventilation switch valve (725) are installed at the top of the fluid terminal storage facilities (850) (such as FIG. 25 is a structural schematic view of an embodiment, showing that the secondary segment fluid storage facilities (850) is further installed at the position higher than that of the relay fluid storage barrel (700), for storing the fluid pumped by the pump (704) through the fluid piping (810), the secondary segment fluid storage facilities (850) is the fluid terminal storage facilities, or which is installed with a fluid port (723) for fluid external flow, and the auxiliary fluid piping (820) is installed between the relay fluid storage barrel (700) and the secondary segment fluid storage facilities (850), according to the present invention).

If the secondary segment fluid storage facilities (850) is enclosed structure, the fluid within the relay fluid storage barrel (700) is pumped by the pump (704), which is controlled by human or by the control device (2000), and enters into the secondary segment fluid storage facilities (850) through the fluid piping (810), and the air within the secondary segment fluid storage facilities (850) enters into the space of the relay fluid storage barrel (700) via the auxiliary fluid piping (820), which is produced by pumping fluid.

Figure 26:
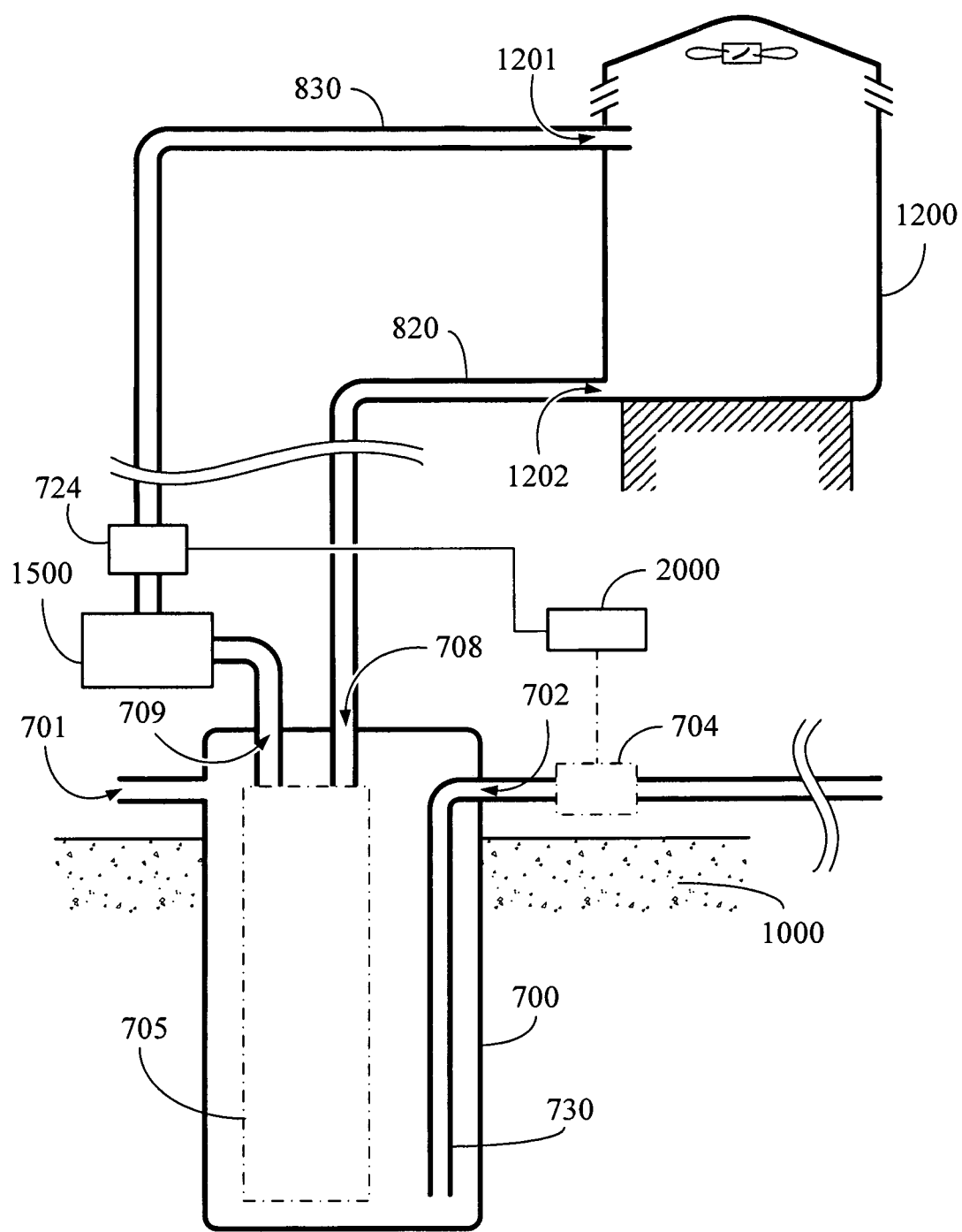
FIG. 26 is a system schematic view of the first embodiment, showing the operation of air conditioning cooling towers connected in series, according to the present invention.

For the vertical fluid heat exchanger installed within natural thermal energy body, which is further applied for the operation of air conditioning cooling towers connected in series, the water cooled by cooling towers is pumped back to air conditioning device through the connected in series flow paths of the thermal energy exchanger (705) installed within the relay fluid storage barrel (700), such as FIG. 26 is a system schematic view of the first embodiment, showing the operation of air conditioning cooling towers connected in series, according to the present invention; as shown in FIG. 26, the main components include:

Relay fluid storage barrel (700): made of thermal conductive material to be integrated or combined, wherein the relay fluid storage barrel (700) is a fluid heat exchanger with the form of vertical relay fluid storage barrel for being close installed, or whole or in part placement into natural thermal energy body (1000) in vertical or downward oblique manner, and the relay fluid storage barrel (700) is installed with at least one fluid inlet (701) and at least one fluid outlet (702) for fluid entering and leaving to perform fluid exchange function; in which the fluid inlet (701) is installed at the position lower than that of the relay fluid storage barrel (700), and the fluid outlet (702) is installed at the position higher than that of the relay fluid storage barrel (700), or vice versa, to prevent the fluid at lower part within the relay fluid storage barrel (700) from stagnation; or as shown in FIG. 26, the fluid inlet (701) and the fluid outlet (702) are installed at upper part within the relay fluid storage barrel (700) to facilitate maintenance, and the flow guiding structure (730) for guiding the flow of internal fluid to flow from top to bottom is placed inside the relay fluid storage barrel (700) to connect the fluid inlet (701) and/or the fluid outlet (702), for ensuring the flow path between the fluid inlet (701) and the fluid outlet (702) passing through the bottom of the relay fluid storage barrel (700) to prevent the fluid at lower part within the relay fluid storage barrel (700) from stagnation; and wherein the fluid passing through the relay fluid storage barrel (700) is controlled by human or by control device (2000) for pumping or pump-priming, by way of external pressure, or gravity with potential difference, or the pump (704) being installed at the fluid inlet (701) and/or the fluid outlet (702), to drive the fluid in liquid state, or gaseous state, or liquid to gaseous state, or gaseous to liquid state for pumping, or stop, or adjustment of pumping flow rate;

there are one or more cylindrical relay fluid storage barrels (700) inside installed with the thermal energy exchanger (705), and if two or more relay fluid storage barrels (700) exist, the fluid pathways in the individual relay fluid storage barrel (700) are series connection, parallel connection, or series-parallel connection;

the thermal energy exchanger (705) has independent flow paths for fluid passing through, to perform heat exchange with the fluid in the relay fluid storage barrel (700); and the fluid piping of the thermal energy exchangers (705) are installed with the fluid inlet (708) and the fluid outlet (709);

the individual fluid pathway of the thermal energy exchanger (705) is installed with fluid inlet and fluid outlet; and the fluid passing through the fluid pathway of the thermal energy exchanger (705) is controlled for pumping or pump-priming, by way of external pressure, or gravity with potential difference, or the pump (714) being installed, to individually drive the same or different fluid in liquid state, or gaseous state, or liquid to gaseous state, or gaseous to liquid state; and Cooling tower (1200): related to a conventional air conditioning cooling tower, wherein the cooling tower installed with a high temperature water inlet (1201) and a cooling water outlet (1202) is a heat exchanger for passing through the auxiliary fluid piping (820) and leading to the fluid inlet (708) of the thermal energy exchanger (705), and then leaving the fluid outlet (709) and leading to air-conditioning device (1500), and high temperature water pumped by the pump (724) connected in series for passing through auxiliary fluid piping (830) to the high temperature water inlet (1201) and entering into the cooling tower (1200).

Figure 27:
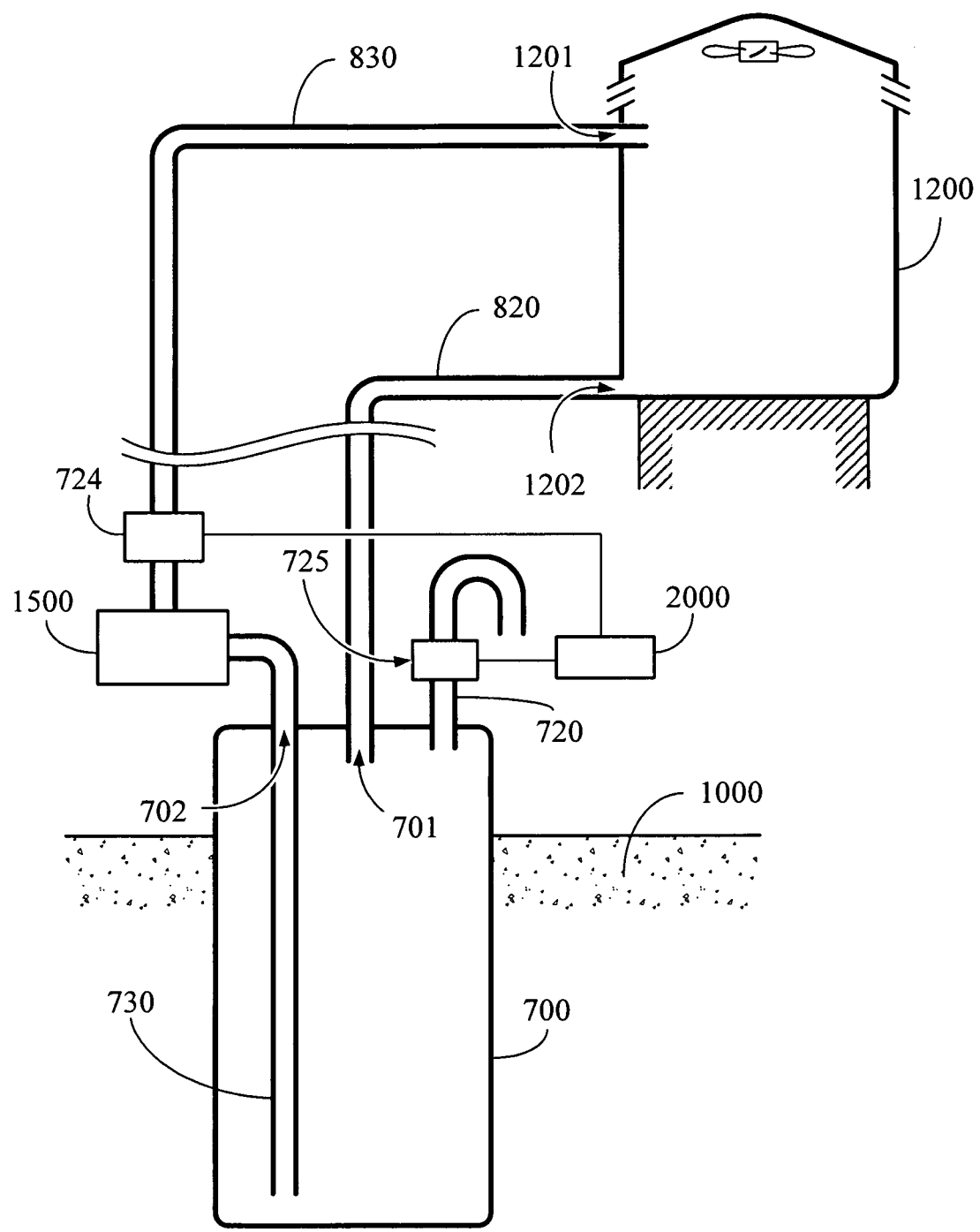
FIG. 27 is a system schematic view of the second embodiment, showing the operation of air conditioning cooling towers connected in series, according to the present invention.

FIG. 27 is a system schematic view of the second embodiment, showing the operation of air conditioning cooling towers connected in series, according to the present invention, which shows the states of the relay fluid storage barrel (700), as shown in the embodiment of FIG. 26, directly storing fluids and the fluid inlet (701) and the fluid outlet (702), wherein the fluid within the heat exchanger of air-conditioning device (1500) is pumped by a pump (724) and/or the ventilation switch valve (725), which are controlled by the control device (2000), for passing through the auxiliary fluid piping (830), and entering into the cooling tower (1200) from the high temperature water inlet (1201), and then the fluid leaves the cooling water outlet (1202), passes through the fluid inlet (701) via the auxiliary fluid piping (820), enters into the relay fluid storage barrel (700), and is transmitted to the fluid inlet of the air-conditioning device (1500) via the fluid outlet (702); the relay fluid storage barrel (700) without the thermal energy exchanger (705) performs heat exchange with the natural thermal storage body through the shell thereof.

Figure 28:
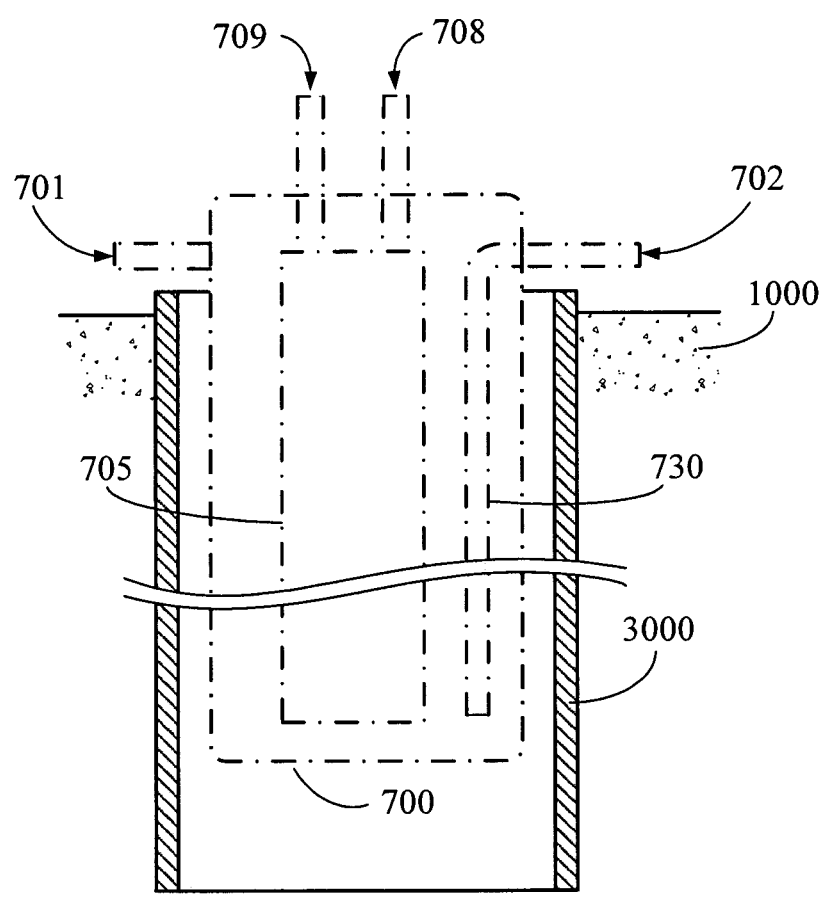
FIG. 28 is a structural schematic view of an embodiment, showing that an external conduit (3000) is installed around the relay fluid storage barrel (700), according to the present invention.

For the vertical fluid heat exchanger installed within natural thermal energy body, if whole or in part of which is placed into natural thermal energy body installed in water or strata, an external conduit (3000), whose internal diameter is bigger than or equal to the external diameter of the relay fluid storage barrel (700), is further installed around the relay fluid storage barrel (700), such as FIG. 28 is a structural schematic view of an embodiment, showing that the external conduit (3000) is installed around the relay fluid storage barrel (700), according to the present invention; wherein:

External conduit (3000): made of conductive materials, wherein the internal diameter of which is bigger than or equal to the external diameter of the relay fluid storage barrel (700), and the length of which is equal to or longer than that of the relay fluid storage barrel (700); and wherein the external conduit (3000) directly contacts with the relay fluid storage barrel (700), and there is an interval for placement or removal of the relay fluid storage barrel (700), or for filling conductive materials in colloidal state, and/or liquid state, and/or solid state.

The invention claimed is:

1. A vertical heat exchanger installed within a natural thermal energy body (1000), comprising:

a relay storage barrel (700) made of a thermally conductive material and at least partly placed in or installed in proximity to the natural thermal energy body (1000) in a vertical or downwardly oblique orientation for temporarily storing a relay fluid, said relay storage barrel (700) including a first fluid inlet (701) on a first side of the relay storage barrel (700) and a first fluid outlet (702) on a second side of the relay storage barrel (700) to enable continuous passage of the relay fluid from the first side to the second side, said thermally conductive material serving as a primary means for exchanging thermal energy between said relay fluid and said natural thermal energy body (1000) while said relay fluid passes through said relay storage barrel (700) from the first side to the second side; and at least one thermal energy exchanger (705) installed inside the relay fluid storage barrel (700) between said first side and said second side and having piping that forms at least one independent thermal exchange fluid flow path for passage of a thermal exchange fluid, said piping having a second fluid inlet (708) and a second fluid outlet (709), wherein the thermal energy exchanger (705) exchanges thermal energy between the relay fluid passing through the relay storage barrel (700) and the thermal exchange fluid in the thermal energy exchanger (705)

wherein the relay fluid storage barrel (700) is situated in an external conduit (3000) having an internal diameter larger than an external diameter of the relay fluid storage barrel (700), said external conduit being made of a thermally conductive material, and wherein the external conduit (3000) is separated from the relay fluid storage barrel (700) by a space that is filled with a thermally conductive material in at least one of a colloidal, liquid, and solid state.

2. A vertical heat exchanger installed within a natural thermal energy body (1000) as claimed in claim 1, wherein the natural thermal body (1000) is a layer of earth or a body of water.

3. A vertical heat exchanger installed within a natural thermal energy body (1000) as claimed in claim 1, wherein the relay fluid is one of tap-water and water from a river, lake, or sea.

4. A vertical heat exchanger installed within a natural thermal energy body (1000) as claimed in claim 1, wherein said thermal exchange fluid is in one of a liquid state, a gaseous state, a liquid-to-gaseous state, and a gaseous-to-liquid state.

5. A vertical heat exchanger installed within a natural thermal energy body (1000) as claimed in claim 1, wherein passage of the relay fluid into and out of the relay fluid storage barrel (700) is controlled by at least one of manual control, a switch valve (703), a control device (2000) for controlling the passage of the relay fluid into and out of the relay fluid storage barrel (700), and at least one pump (704 and/or 714) installed at the first fluid inlet (701), the first fluid outlet (702), or both the first fluid inlet (701) and the first fluid outlet (702).

6. A vertical heat exchanger installed within a natural thermal energy body (1000) as claimed in claim 1, wherein passage of the relay fluid into and out of the relay fluid storage barrel (700) is controlled by a pump (704) installed at the first fluid outlet (702) of the relay fluid storage barrel (700).

7. A vertical heat exchanger installed within a natural thermal energy body (1000) as claimed in claim 6, further comprising a control device (2000) for controlling the pump.

8. A vertical heat exchanger installed within a natural thermal energy body (1000) as claimed in claim 1, wherein the piping of the thermal energy exchanger (705) includes at least one of the following geometric shaped piping configurations: U-shaped fluid piping, spiral fluid piping, wavy fluid piping, and U-shaped piping additionally installed with thermally conductive fins.

9. A vertical heat exchanger installed within a natural thermal energy body (1000) as claimed in claim 8, further comprising a second said thermal energy exchanger (705') that includes a second piping having a third fluid inlet (708') and a third fluid outlet (709'), said second piping carrying a same or different thermal exchange fluid than the piping of the thermal energy exchanger (705).

10. A vertical heat exchanger installed within a natural thermal energy body (1000) as claimed in claim 9, wherein the piping of the thermal energy exchanger (705) and the second piping are each bent into a U-shape.

11. A vertical heat exchanger installed within a natural thermal energy body (1000) as claimed in claim 10, wherein said first and second piping have one of the following configurations: parallel and side-by-side; and parallel and crossing at a 90 degree angle.

12. A vertical heat exchanger installed within a natural thermal energy body (1000) as claimed in claim 10, wherein said first and second piping are connected to each other.

13. A vertical heat exchanger installed within a natural thermal energy body (1000) as claimed in claim 10, wherein said first and second piping cross each other at a predetermined angle.

14. A vertical heat exchanger installed within a natural thermal energy body (1000) as claimed in claim 1, wherein one of the first fluid inlet (701) and first fluid outlet (702) is installed at a first position in the relay fluid storage barrel (700) and one of the first fluid inlet (701) and first fluid outlet (702) is installed at a second position in the relay fluid storage barrel (700), and wherein the second position is higher than the first position to prevent stagnation of a relay fluid within a lower part of the relay fluid storage barrel (700).

15. A vertical heat exchanger installed within a natural thermal energy body (1000) as claimed in claim 1, further comprising at least one switch valve (703) for opening and closing at least one of said first fluid inlet (701) and first fluid outlet (702) to stop, start, or control a flow rate of said relay fluid into and out of said relay fluid storage barrel (700), said switch valve (703) being manually controlled or controlled by a control device (2000).

16. A vertical heat exchanger installed within a natural thermal energy body (1000) as claimed in claim 1, wherein said relay fluid storage barrel (700) has one of a circular, oval, or star-shaped cross-section.

17. A vertical heat exchanger installed within a natural thermal energy body (1000) as claimed in claim 1, further comprising a first controllable valve (801) installed at said first fluid inlet, a second controllable valve (802) installed at the fluid outlet (702), and shunt piping (800) connecting said first controllable valve (801) with said second controllable valve (802), said first controllable valve (801) and second controllable valve (802) regulating flow of the relay fluid into and out of the relay fluid storage barrel (700) by controlling shunting of the relay fluid through the shunt piping (800) according to one or more of the following flow control modes:
   (a) blocking the relay fluid from passing through the shunt piping (800) so that all of the relay fluid flows into and out of the relay fluid storage barrel (700);
   (b) blocking the relay fluid from entering into the relay fluid storage barrel (700) so that all of the relay fluid flows through the shunt piping (800);
   (c) enabling part of the relay fluid to flow into the relay fluid storage barrel (700) and part of the relay fluid to flow through the shunt piping (800); and
   (d) adjusting a flow rate of the relay fluid into the relay fluid storage barrel (700).

18. A vertical heat exchanger installed within a natural thermal energy body (1000) as claimed in claim 1, wherein at least one of the relay fluid storage barrel (700) and thermal energy exchanger (705) is an integrated or combined structure to facilitate dismantling and maintenance.

19. A vertical heat exchanger installed within a natural thermal energy body (1000) as claimed in claim 1, wherein overflow of the relay fluid is prevented by one or both of (a) ventilation piping (720) installed at a position higher than a position of a source of the relay fluid to prevent overflow of the relay fluid, and (b) a ventilation switch valve (725) that is manually controlled or controlled by a control device (2000) to eliminate a negative pressure caused by pumping the relay fluid out of the relay fluid storage barrel (700).

20. A vertical heat exchanger installed within a natural thermal energy body (1000) as claimed in claim 1, further comprising a pump (714) installed in series between a second fluid outlet (702') of the relay storage barrel (700) and an upstream fluid piping or fluid source (900), said pump (714) being manually controlled or controlled by a control device (2000) to pump part of the relay fluid in the relay storage barrel (700) upstream through a fluid return piping (750) connected between the second fluid outlet (702') and the fluid source (900) to provide said thermal energy adjustment.

21. A vertical heat exchanger installed within a natural thermal energy body (1000) as claimed in claim 1, wherein at least one secondary segment storage facility (850) is further installed at a position higher than that of the relay fluid storage barrel (700) for storing the relay fluid pumped by a pump (704) from the relay fluid storage barrel (700) through a storage facility fluid piping (810) connected between the first fluid outlet (702) and the at least one secondary segment storage facility (850).

22. A vertical heat exchanger installed within a natural thermal energy body (1000) as claimed in claim 21, wherein said at least one secondary segment storage facility (850) includes at least one of a fluid port (723) for enabling external fluid flow at a bottom of the at least one secondary segment storage facility (850), ventilation piping (720) installed at a top of the at least one secondary segment storage facility (850), and a ventilation switch valve (725) installed at a top of the at least one secondary segment storage facility (850).

23. A vertical heat exchanger installed within a natural thermal energy body (1000) as claimed in claim 21, wherein the at least one secondary segment storage facility (850) is further connected to the relay fluid storage barrel (700) by an auxiliary fluid piping (820) that enables return of the relay fluid from the secondary segment storage facility (850) to the relay fluid storage barrel (700).

24. A vertical heat exchanger installed within a natural thermal energy body (1000) as claimed in claim 1, further comprising an air conditioner (1500) having an inlet connected to the second fluid outlet (709) of the thermal energy exchanger (705), and an air conditioner cooling tower (1200) having a high temperature inlet (1201) connected to the air conditioner (1500) by a first auxiliary piping (830), said air conditioner cooling tower further including a cooling tower outlet (1202) connected to the second fluid inlet (708) of the heat exchanger (705) by second auxiliary piping (820) to form a closed circuit for circulation of the thermal exchange fluid through the air conditioner (1500) and through the air conditioner cooling tower (1200).

25. A vertical heat exchanger installed within a natural thermal energy body (1000) as claimed in claim 24, further comprising a pump (724) for pumping said thermal exchange fluid from the air conditioner (1500) through the first auxiliary piping (830) to the at least one cooling tower (1200).

26. A vertical heat exchanger installed within a natural thermal energy body (1000) as claimed in claim 1, further comprising at least one flow guiding structure (730, 730') for guiding the flow of internal fluid to flow from top to bottom and placed inside the relay fluid storage barrel (700), for ensuring that the flow path between the fluid inlet (701) and the at least one fluid outlet (702, 702') passes through the bottom of the relay fluid storage barrel (700) to prevent the fluid at lower part within the relay fluid storage barrel (700) from stagnation.

27. A vertical heat exchanger installed within a natural thermal energy body (1000) as claimed in claim 20, further comprising:
   wherein the fluid inlet (701) is installed at a position lower than a position of at least one of the first and second fluid outlets (702, 702'), or vice versa, to prevent the fluid at a lower part within the relay fluid storage barrel (700) from stagnation.

* * * * *